(12) United States Patent
Zheng et al.

(10) Patent No.: US 11,639,685 B1
(45) Date of Patent: May 2, 2023

(54) BLADES INCLUDING INTEGRATED DAMPING STRUCTURES AND METHODS OF FORMING THE SAME

(71) Applicant: General Electric Company, Schenectady, NY (US)

(72) Inventors: Li Zheng, Niskayuna, NY (US); Nicholas J. Kray, Evendale, OH (US); Changjie Sun, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/537,223

(22) Filed: Nov. 29, 2021

(51) Int. Cl.
| | |
|---|---|
| *F01D 5/16* | (2006.01) |
| *F02C 7/00* | (2006.01) |
| *F01D 5/18* | (2006.01) |
| *F01D 5/26* | (2006.01) |

(52) U.S. Cl.
CPC .............. *F02C 7/00* (2013.01); *F01D 5/16* (2013.01); *F01D 5/18* (2013.01); *F01D 5/26* (2013.01); *F05D 2220/32* (2013.01); *F05D 2260/96* (2013.01)

(58) Field of Classification Search
CPC ..... F02C 7/00; F01D 5/16; F01D 5/18; F01D 5/26; F05D 2220/32; F05D 2260/96
See application file for complete search history.

(56) References Cited

U.S. PATENT DOCUMENTS

| | | | | |
|---|---|---|---|---|
| 4,118,147 A | * | 10/1978 | Ellis ......................... | F01D 5/16 416/500 |
| 5,269,058 A | * | 12/1993 | Wiggs ..................... | F01D 5/147 29/889.7 |
| 5,295,789 A | * | 3/1994 | Daguet ................... | B64C 11/22 416/241 A |
| 5,947,688 A | * | 9/1999 | Schilling .................. | F01D 5/16 416/241 A |
| 6,039,542 A | * | 3/2000 | Schilling .................. | F01D 5/16 416/232 |
| 6,979,180 B2 | | 12/2005 | Motherwell | |
| 7,458,780 B2 | * | 12/2008 | Weisse ................... | F04D 29/324 416/233 |
| 8,083,489 B2 | * | 12/2011 | Viens ..................... | F04D 29/324 416/241 A |
| 8,585,368 B2 | * | 11/2013 | Viens ..................... | F04D 29/324 416/224 |
| 8,821,124 B2 | * | 9/2014 | Viens ..................... | F04D 29/388 416/241 A |

(Continued)

FOREIGN PATENT DOCUMENTS

| | | |
|---|---|---|
| EP | 3029267 | 6/2016 |
| WO | 2020122886 | 6/2020 |

*Primary Examiner* — Igor Kershteyn
*Assistant Examiner* — Theodore C Ribadeneyra
(74) *Attorney, Agent, or Firm* — Hanley, Flight and Zimmerman, LLC

(57) ABSTRACT

Blades including integrated damping structures are disclosed herein. An airfoil to be disposed within a flow path of a gas turbine engine, the gas turbine engine defining an axial axis, a radial axis and a circumferential axis comprising an airfoil body including a first face, a second face and a recessed portion formed in the second face, and an airfoil cap having a first surface, the airfoil cap disposed within the recessed portion, the first surface substantially flush with the second face.

20 Claims, 6 Drawing Sheets

(56) References Cited

U.S. PATENT DOCUMENTS

| | | | | |
|---|---|---|---|---|
| 8,944,773 | B2* | 2/2015 | Weisse | B23P 15/04 416/233 |
| 9,221,120 | B2* | 12/2015 | Schwarz | F01D 5/147 |
| 9,915,272 | B2* | 3/2018 | Maurizio | F01D 5/147 |
| 10,018,052 | B2 | 7/2018 | Snyder et al. | |
| 10,036,258 | B2 | 7/2018 | Mongillo et al. | |
| 10,060,266 | B2* | 8/2018 | Cosby | F04D 29/324 |
| 10,156,359 | B2 | 12/2018 | Zelesky et al. | |
| 10,400,625 | B2 | 9/2019 | Cortequisse | |
| 10,465,715 | B2* | 11/2019 | Pollack | F04D 29/388 |
| 10,557,353 | B2* | 2/2020 | Malmborg | F01D 5/16 |
| 10,570,746 | B2 | 2/2020 | Mongillo et al. | |
| 10,612,387 | B2 | 4/2020 | Malmborg | |
| 10,662,781 | B2 | 5/2020 | Mongillo et al. | |
| 10,731,473 | B2 | 8/2020 | Snyder et al. | |
| 10,731,495 | B2* | 8/2020 | Propheter-Hinckley | F04D 29/083 |
| 10,793,943 | B2* | 10/2020 | Malmborg | F01D 5/28 |
| 10,808,718 | B2* | 10/2020 | Hui | F02K 3/06 |
| 10,919,116 | B2* | 2/2021 | Bales | B23K 26/389 |
| 10,995,632 | B2* | 5/2021 | Malmborg | F01D 5/147 |
| 11,009,036 | B2* | 5/2021 | Husband | F04D 19/002 |
| 11,014,190 | B2* | 5/2021 | Malmborg | B21D 53/78 |
| 11,033,993 | B2* | 6/2021 | Malmborg | F01D 5/147 |
| 11,148,221 | B2* | 10/2021 | Bales | F01D 5/147 |
| 11,174,737 | B2* | 11/2021 | Dolan | B23K 20/129 |
| 11,236,619 | B2* | 2/2022 | Bales | F01D 5/187 |
| 11,248,477 | B2* | 2/2022 | Bales | F01D 5/3061 |
| 2011/0070085 | A1* | 3/2011 | El-Aini | F01D 5/16 416/145 |
| 2011/0070092 | A1* | 3/2011 | Gerlach | B29C 70/088 428/68 |
| 2011/0211965 | A1 | 9/2011 | Deal et al. | |
| 2013/0108470 | A1* | 5/2013 | Weisse | B23P 15/04 416/97 R |
| 2019/0040744 | A1* | 2/2019 | Bales | F04D 29/324 |
| 2020/0298352 | A1* | 9/2020 | Malmborg | F01D 5/147 |

* cited by examiner

BLADES INCLUDING INTEGRATED DAMPING STRUCTURES AND METHODS OF FORMING THE SAME

FIELD OF THE DISCLOSURE

This disclosure relates generally to gas turbines, and, more particularly, to blades including integrated damping structures and methods of forming the same.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section. A gas turbine engine produces a thrust that propels a vehicle forward, e.g., a passenger aircraft. The thrust from the engine transmits loads to a wing mount, e.g., a pylon, and, likewise, the vehicle applies equal and opposite reaction forces onto the wing via mounts.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Figure 1:
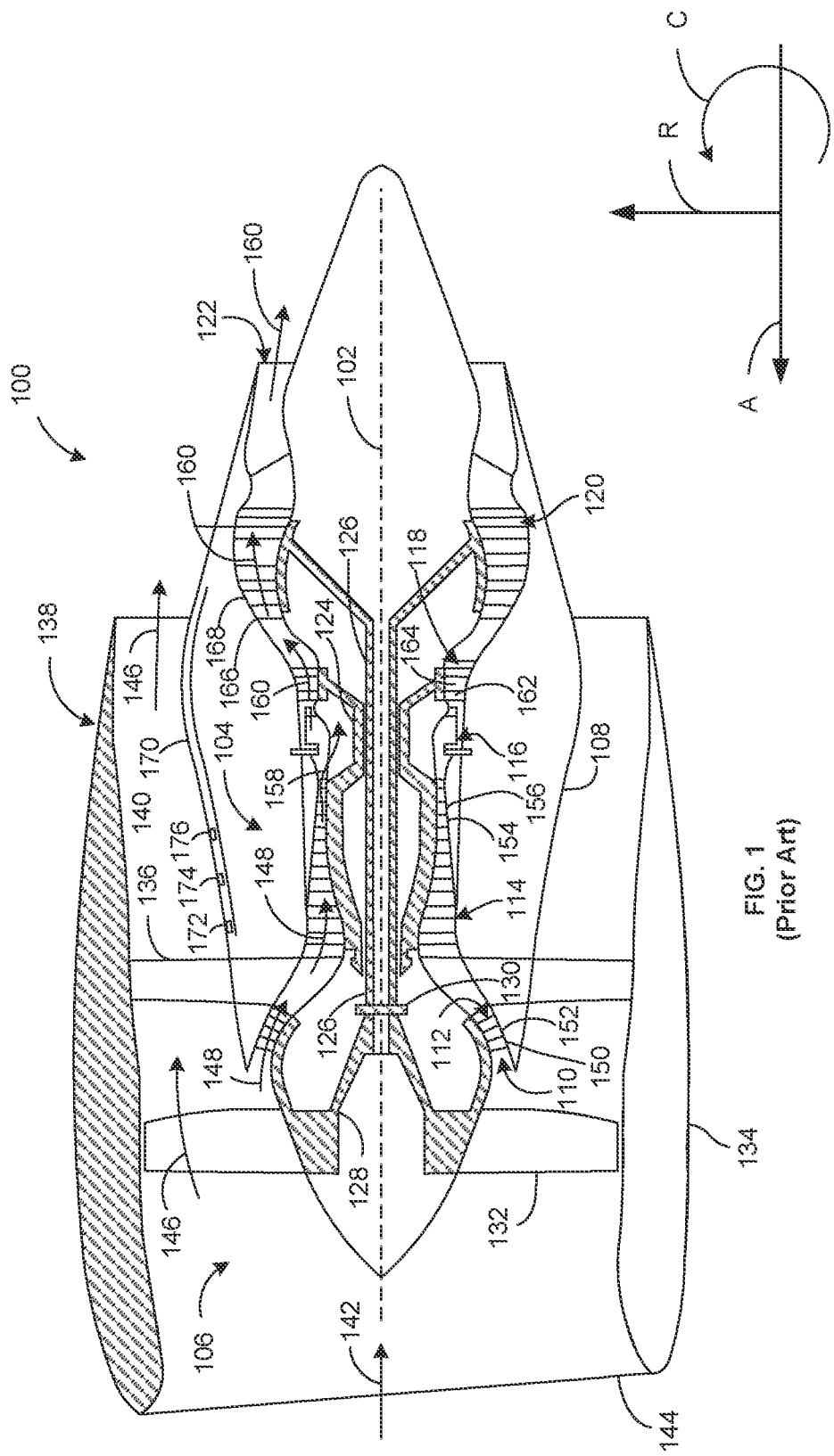
FIG. 1 illustrates a cross-sectional view of a prior gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The operation of gas turbine engines can cause fan blades, airfoils, and/or vanes to vibrate, flutter and undergo other undesired movements. In some examples, unmitigated vibration can lead to damage to the fan and/or the fan blade. Examples disclosed herein overcome the above-noted deficiencies using internal features which slide/rub during operation of the airfoil. In some examples disclosed herein, fan blades include a two-part cap and body configuration which facilitate the usage of sliding/rubbing features. In the examples disclosed herein, the fan blades include internal features which provide frictional damping (e.g., Coulomb damping, etc.) for the fan blades via internal sandwich joints and/or slip joints. The example fan blades disclosed herein include internal features which reduce the weight and improve the vibrational response of these fan blades when compared to prior fan blades.

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with reference to the axial direction, radial direction, and circumferential direction of the gas turbine associated with the features, forces and moments. In general, the attached figures are annotated with a set of axes including the axial axis A, the radial axis R, and the circumferential axis C. As used herein, the terms "longitudinal," and "axial" are used interchangeably to refer to directions parallel to the axial axis. As used herein, the term "radial" is used to refer to directions parallel to the radial axis. As used herein, the term "circumferential" is used to refer to directions parallel to the circumferential axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, two or more surfaces are "substantially flush" or "substantially level" when the profile of the surfaces is within a 5% tolerance. As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Referring now to the drawings, wherein identical numerals indicate the same elements throughout the figures, FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172, 174, 176. The cowling 170 is a covering which may reduce drag and cool the engine. The offset-arch gimbals 172, 174, 176 may, for example, include infrared cameras to detect a thermal anomaly in the under-cowl area of the turbofan 100.

Figure 2:
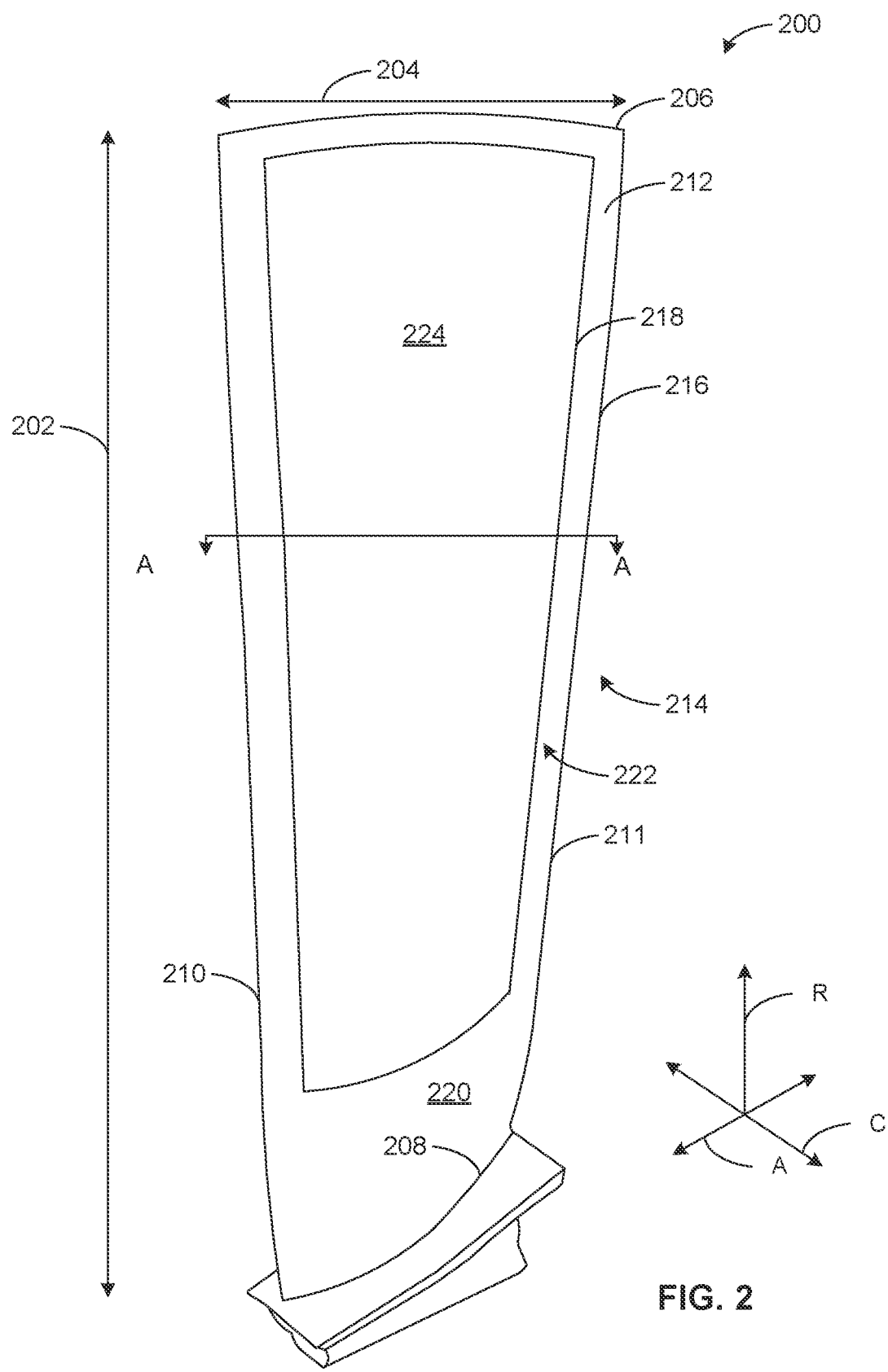
FIG. 2 illustrates a front view of a fan blade implemented in accordance with the teachings of this disclosure.

FIG. 2 illustrates a front view of a fan blade 200 implemented in accordance with the teachings of this disclosure. The fan blade 200 can be used in conjunction with the fan blades 132 of FIG. 1. In the illustrated example of FIG. 2, the fan blade 200 has a span 202, a chord 204, a tip 206, and a root 208. In the illustrated example of FIG. 2, the fan blade 200 has a leading edge 210, a trailing edge 211, a first face 212, and a second face 214. In FIG. 2, the fan blade 200 includes an airfoil body 216 and a cap 218. The airfoil body 216 has a first face 212 and the cap 218 has a second face 224. While the examples disclosed herein are described with reference to the fan blade 200, in other examples, the teachings of this disclosure can be implemented on any airfoil.

The fan blade 200 extends from the root 208 to the tip 206, which defines the span 202. The fan blade 200 can be composed of any suitable material (e.g., titanium, aluminum, steel, a nickel alloy, a copper alloy, an iron alloy, another metal, a reinforced plastic, fiberglass, a metal composite, a carbon polymer, glass polymer, another polymer, etc.) or a combination thereof. In some examples, the airfoil body 216 and the cap 218 are composed of the same material(s). In other examples, the airfoil body 216 and the cap 218 can be composed of different materials. The fan blade 200 can have any suitable shape, size, and/or thickness. The fan blade 200 can be manufactured via additive manufacture, machining and/or any other suitable manufacturing method. An example method of manufacturing the fan blade 200 is described below in conjunction with FIG. 6.

In FIG. 2, the cap 218 is disposed within the recessed portion 222 (e.g., a groove, a recess, a chamber, a fillister, foramen, fossa, a trough, etc.) of the airfoil body 216. In the illustrated example of FIG. 2, the face 220 of the airfoil body 216 and the face 224 of the cap 218 are flush (e.g., even, level, etc.) and form the first face 212 of the airfoil. In FIG. 2, the face 224 and corresponding opening in the recessed portion 222 are shaped similarly to the face 212. In other examples, the face 224 and corresponding opening of the recessed portion 222 can have any other suitable shape.

In FIG. 2, the airfoil body 216 and the cap 218 form a plurality of interfaces. The plurality of interfaces allows portions of the airfoil body 216 to slide (e.g., rub, slip, etc.) against portions of the cap 218 in a manner that damps the vibratory response of the fan blade 200 via frictional damping. That is, the frictional damping provided by the interface between the airfoil body 216 and the cap 218 causes excess energy from the vibration of the fan blade 200 to dissipate. In some examples, the plurality of interfaces between the airfoil body 216 and the cap 218 can be configured to prevent critical vibrational modes of the fan blade 200. Example configurations of the airfoil body 216 and the cap 218 are described below in conjunction with FIGS. 3 and 4.

Figure 3:
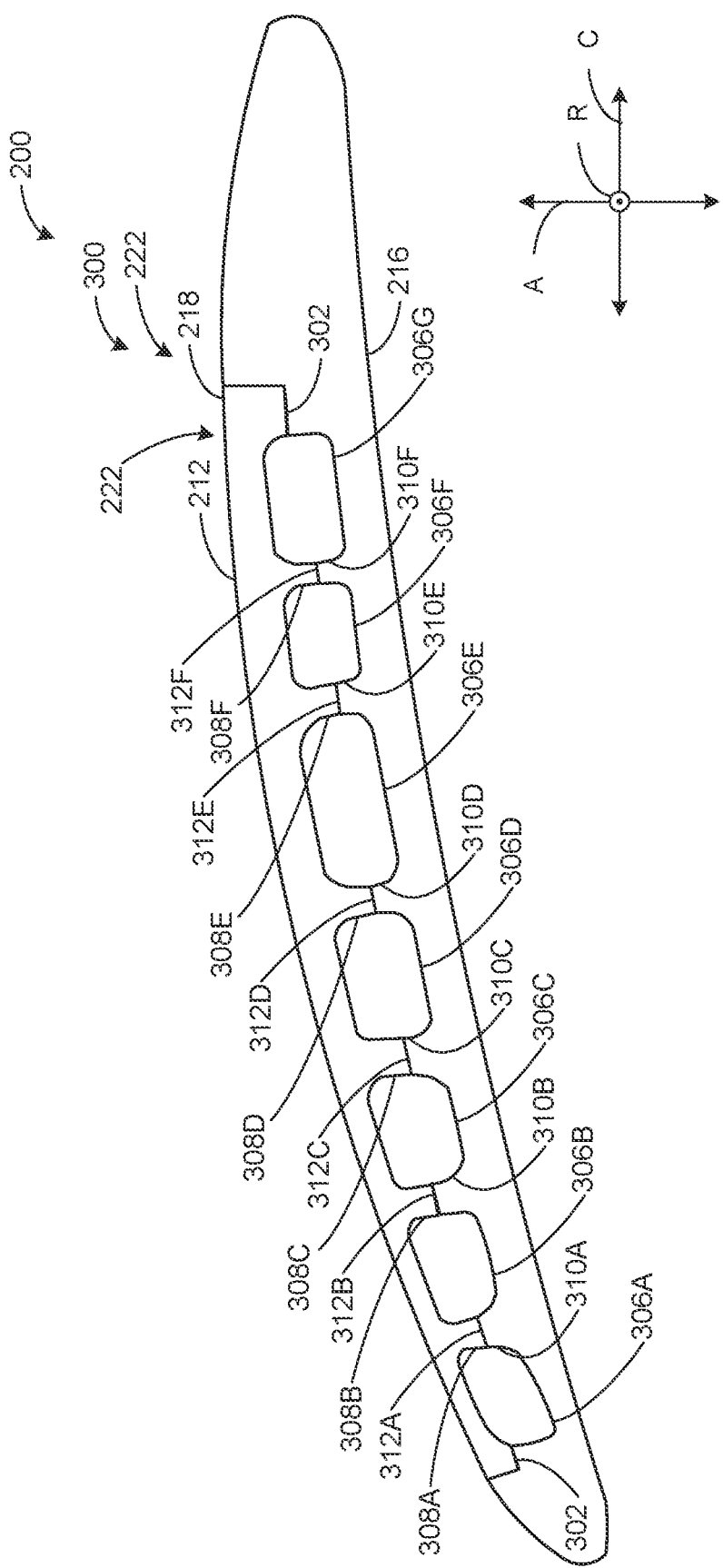
FIG. 3 illustrates a first example cross-section structure of the fan blade of FIG. 2.

FIG. 3 illustrates a first example cross-sectional structure 300 of the fan blade 200 of FIG. 2. In the illustrated example of FIG. 3, the cross-sectional structure 300 is formed by the airfoil body 216 and the cap 218. In the illustrated example of FIG. 3, the cap 218 is disposed on a lip 302 of the airfoil body 216. In the illustrated example of FIG. 3, the cross-sectional structure 300 includes a first cavity 306A, a second cavity 306B, a third cavity 306C, a fourth cavity 306D, a fifth cavity 306E, a sixth cavity 306F and a seventh cavity 306G, etc. In the illustrated example of FIG. 3, the cap 218 includes a first cap rib 308A, a second cap rib 308B, a third cap rib 308C, a fourth cap rib 308D, a fifth cap rib 308E, and a sixth cap rib 308F. In the illustrated example of FIG. 3, the airfoil body 216 includes a first body rib 310A, a second body rib 310B, a third body rib 310C, a fourth body rib 310D, a fifth body rib 310E, and a sixth body rib 310F. In the illustrated example of FIG. 3, the first cap rib 308A and the first body rib 310A form a first interface 312A, the second cap rib 308B and the second body rib 310B form a second interface 312B, the third cap rib 308C and the third body rib 310C form a third interface 312C, the fourth cap rib 308D and the fourth body rib 310D form a fourth interface 312D, the fifth cap rib 308E and the fifth body rib 310E form a fifth interface 312E, and the sixth cap rib 308F, and the sixth body rib 310F form a sixth interface 312F. While the illustrated example of FIG. 3 includes seven cavities and the associated ribs, other examples implemented in accordance with the teachings of this disclosure can include any suitable number cavitie(s) and rib(s).

In some examples, the cap 218 and the airfoil body 216 can be coupled together via an adhesive, a weld, a press-fit locking mechanism, a shrink-fit locking mechanism, etc. For example, an adhesive can be disposed on the lip 302 to bind the cap 218 when disposed on in recessed portion 222. In the illustrated example of FIG. 3, the coupling of the cap 218 and the airfoil body 216 forms the first face 212 such that the first face 212 is substantially level (e.g., substantially flush, etc.) and continuous. In some examples, the contacts (e.g., at the lip 302, the interfaces 312A, 312B, 312C, 312D, 312E, 312F, etc.) between the cap 218 and the airfoil body 216 can include a wear-resistant coating (e.g., a cobalt molybdenum chromium coating, a polytetrafluoroethylene coating, etc.).

In the illustrated example of FIG. 3, the cavities 306A, 306B, 306C, 306D, 306E, 306F, 306G are internal structures in the fan blade 200. The cavities 306A, 306B, 306C, 306D, 306E, 306F, 306G reduce the overall weight of the fan blade 200 when compared to an airfoil of the same size and shape without cavities. In the illustrated example of FIG. 3, the cavities 306A, 306B, 306C, 306D, 306E, 306F, 306G are not of uniform size and shape. In other examples, the cavities 306A, 306B, 306C, 306D, 306E, 306F, 306G can have a uniform size and shape. In some examples, the shape of cavities 306A, 306B, 306C, 306D, 306E, 306F, 306G, the ribs 308A, 308B, 308C, 308D, 308E, 308F, 310A, 310B, 310C, 310D, 310E, 310F, and/or the interfaces 312A, 312B, 312C, 312D, 312E, 312F can be designed to reduce the likelihood of the fan blade 200 from vibrating in critical vibrational modes.

The ribs 308A, 308B, 308C, 308D, 308E, 308F are features (e.g., bosses, protrusions, etc.) of the cap 218 that enable the formation of the interfaces 312A, 312B, 312C, 312D, 312E, 312F. The ribs 310A, 310B, 310C, 310D, 310E, 310F are features (e.g., bosses, protrusions, etc.) of the airfoil body 216 that enable the formation of the interface 312A, 312B, 312C, 312D, 312E, 312F. In the illustrated example of FIG. 3, the interfaces 312A, 312B, 312C, 312D, 312E, 312F are formed by abutting ribs of the airfoil body 216 and the cap 218 and are sandwich joints. In FIG. 3, the interfaces 312A, 312B, 312C, 312D, 312E, 312F are oriented in the planes which are substantially parallel to the first face 212. During operation of the fan blade 200, the interfaces 312A, 312B, 312C, 312D, 312E, 312F cause the cap 218 and the airfoil body 216 to slide and/or rub, which frictionally damps the fan blade 200. Particularly, the vibrational energy of the fan blade 200 is dissipated via the rubbing and/or sliding of the interfaces 312A, 312B, 312C, 312D, 312E, 312F (e.g., as heat, etc.)

Figure 4:
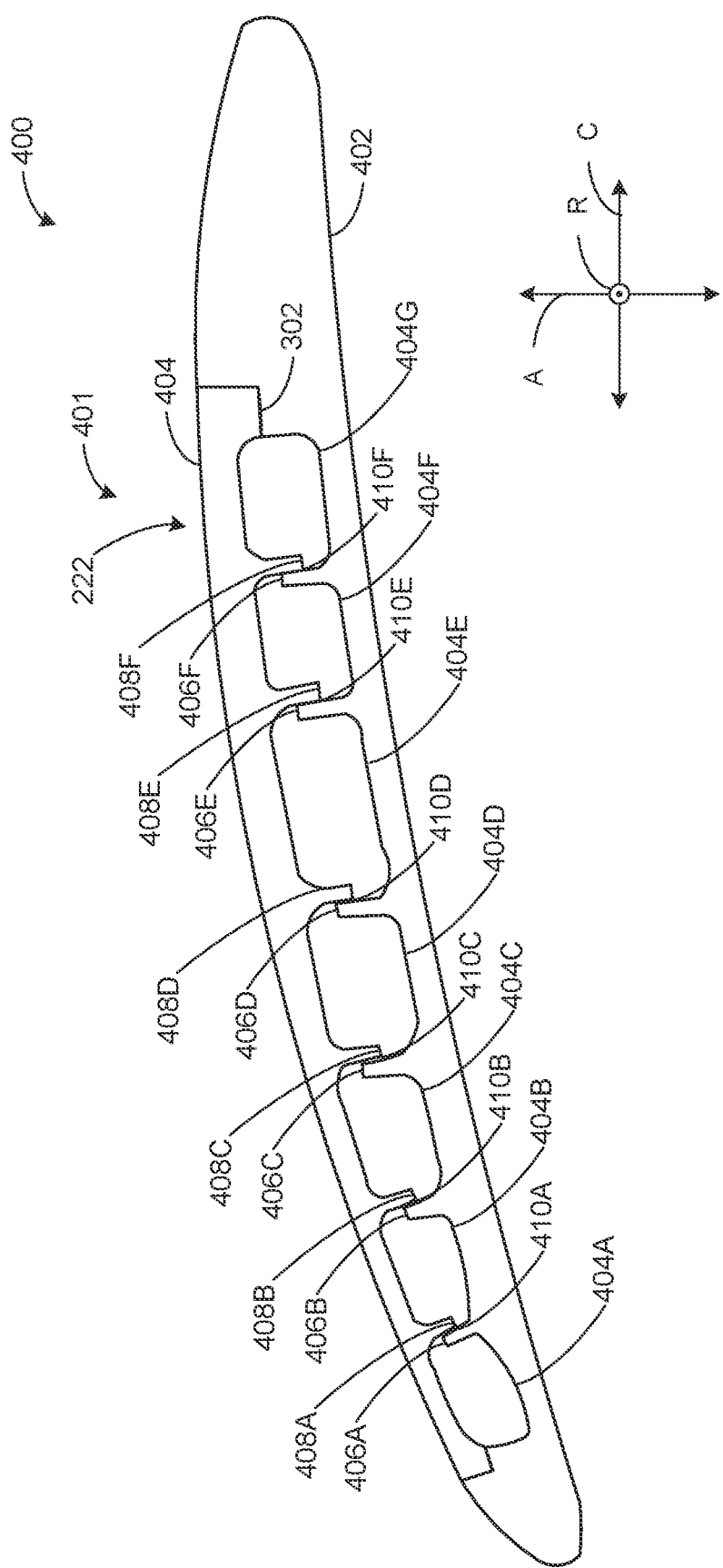
FIG. 4 illustrates a second example cross-section structure of a fan blade similar to the fan blade of FIG. 2.

FIG. 4 illustrates a second example cross-sectional structure 401 of a fan blade 400. In the illustrated example of FIG. 4, the cross-sectional structure 401 is formed by the airfoil body 402 and the cap 404. In the illustrated example of FIG. 4, the cap 404 is disposed on a lip 302 of the airfoil body 402. In the illustrated example of FIG. 4, the cross-sectional structure 401 includes a first cavity 404A, a second cavity 404B, a third cavity 404C, a fourth cavity 404D, a fifth cavity 404E, a sixth cavity 404F, and a seventh cavity 404G. In the illustrated example of FIG. 4, the cap 404 includes a first cap rib 406A, a second cap rib 406B, a third cap rib 406C, a fourth cap rib 406D, a fifth cap rib 406E, and a sixth cap rib 406F. In the illustrated example of FIG. 4, the airfoil body 402 includes a first body rib 408A, a second body rib 408B, a third body rib 408C, a fourth body rib 408D, a fifth body rib 408E, and a sixth body rib 408F. In the illustrated example, the first cap rib 406A and the first body rib 408A form a first interface 410A, the second cap rib 406B and the second body rib 408B form a second interface 410B, the third cap rib 406C and the third body rib 408C form a third interface 410C, the fourth cap rib 406D and the fourth body rib 408D form a fourth interface 410D, the fifth cap rib 406E and the fifth body rib 408E form a fifth interface 410E, and the sixth cap rib 406F and the sixth body rib 408F form a sixth interface 410F. The fan blade 400, the airfoil body 402 and the cap 404 have the same properties and function as the fan blade 200 of FIGS. 2-3, the airfoil body 216 of FIGS. 2-3 and the cap 218 of FIGS. 2-3 unless stated otherwise. While the illustrated example of FIG. 4 includes seven cavities and the associated ribs, other examples implemented in accordance with the teachings of this disclosure can include any suitable number cavitie(s) and rib(s).

In some examples, the cap 404 and the airfoil body 402 can be coupled together via an adhesive, a weld, a press-fit locking mechanism, a shrink-fit locking mechanism, etc. For example, an adhesive can be disposed on the lip 302 to bind the cap 404 when disposed on in recessed portion 222. In the illustrated example of FIG. 3, the coupling of the cap 404 and the airfoil body 402 forms the first face 212 such that the first face 212 is substantially level (e.g., substantially flush, etc.) and continuous. In some examples, the contacts (e.g., at the lip 302, the interfaces 410A, 410B, 410C, 410D, 410E, 410F, etc.) between the cap 404 and the airfoil body 402 can include a wear-resistant coating (e.g., a cobalt molybdenum chromium coating, a polytetrafluoroethylene coating, etc.).

In the illustrated example of FIG. 4, the cavities 404A, 404B, 404C, 404D, 404E, 404F, 404G are internal structures in the fan blade 400 that are formed from the body of the fan blade 400. The cavities 404A, 404B, 404C, 404D, 404E, 404F, 404G reduce the overall weight of the fan blade 400 when compared to an airfoil of the same size and shape without cavities. In the illustrated example of FIG. 4, the cavities 404A, 404B, 404C, 404D, 404E, 404F, 404G are not of uniform size and shape. In other examples, the cavities 404A, 404B, 404C, 404D, 404E, 404F, 404G can have a uniform size and shape. In some examples, the shape of the cavities 404A, 404B, 404C, 404D, 404E, 404F, 404G, the ribs 406A, 408A, 406B, 408B, 406C, 408C, 406D, 408D, 406E, 408E, 406F, 408F, and/or the interfaces 410A, 410B, 410C, 410D, 410E, 410F can be designed to reduce the likelihood of the fan blade 400 from vibrating in critical vibrational modes.

The ribs 406A, 406B, 406C, 406D, 406E, 406F are features (e.g., bosses, protrusions, etc.) of the cap 404 that enable the formation of the interface 410A, 410B, 410C, 410D, 410E, 410F. The ribs 408A, 408B, 408C, 408D, 408E, 408F are features (e.g., bosses, protrusions, etc.) of the body 402 that enable the formation of the interface 410A, 410B, 410C, 410D, 410E, 410F. In the illustrated example of FIG. 4, the interfaces 410A, 410B, 410C, 410D, 410E, 410F are formed by abutting the ribs 406A, 406B, 406C, 406D, 406E, 406F of the cap 404 and the ribs 408A, 408B, 408C, 408D, 408E, 408F of the body 402 are slip joints. In FIG. 3, the interfaces 410A, 410B, 410C, 410D, 410E, 410F are oriented in the planes which are substantially perpendicular to the first face 212. During operation of the fan blade 400, the interfaces 410A, 410B, 410C, 410D, 410E, 410F cause the cap 404 and the body 402 to slide and/or rub, which frictional damps the fan blade 200. Particularly, the vibrational energy of the fan blade 200 is dissipated via the rubbing and/or sliding of the interfaces 410A, 410B, 410C, 410D, 410E, 410F (e.g., as heat, etc.).

Figure 5:
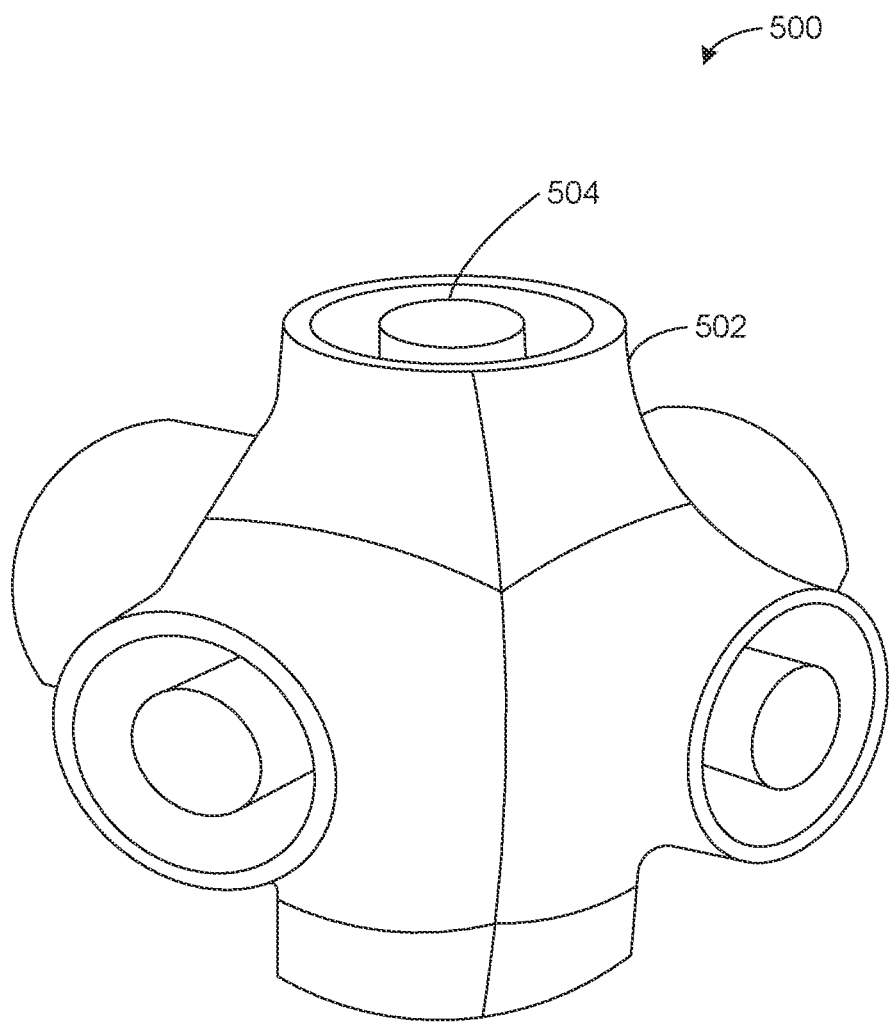
FIG. 5 illustrates a cell structure that may be used with the fan blade of FIG. 2.

FIG. 5 illustrates a cell structure 500 that may be used with the fan blades 200, 400 of FIGS. 2-4. In the illustrated example of FIG. 5, the cell structure 500 includes an internal structure 502 and an external structure 504. In some examples, the cell structure 500 can be deposited in the cavities 306A, 306B, 306C, 306D, 306E, 306F, 306G of the fan blade 200 and/or the cavities 404A, 404B, 404C, 404D, 404E, 404F, 404G. In other examples, the cell structure 500 can be disposed in the center of a fan blade. In some examples, the fan blade and the cell structure 500 can be formed via additive manufacturing (e.g., three-dimensional printing, powder bed fusion, etc.). In some examples, during operation of the fan blades 200, 400, the internal structure 502 and the external structure 504 can slide and/or rub against the other, which frictionally damps the fan blades 200, 400.

Figure 6:
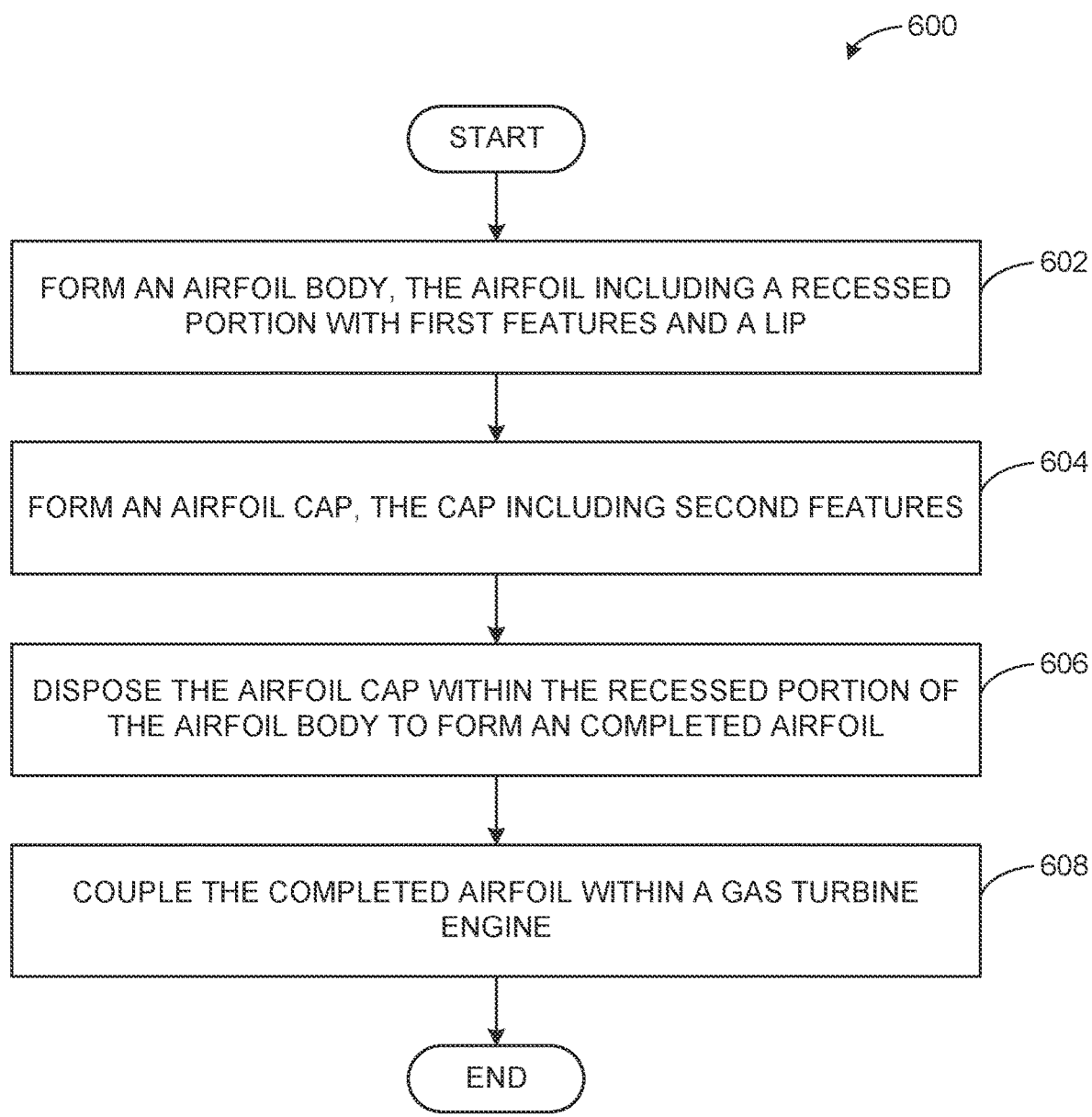
FIG. 6 is a flow diagram illustrating an operation that may be used to manufacture the fan blades of FIGS. 2 and 4.

FIG. 6 is a flow diagram illustrating an operation 600 that may be used to manufacture the fan blades 200, 400 of FIGS. 2-4. While the operation 600 is described with primary reference to the fan blade 200 of FIGS. 2 and 3, the operation 600 can be used to manufacture any other fan blades described herein.

At block 602, the airfoil body 216 is formed. The example airfoil body 216 includes a recessed portion 222 with first features and a lip 302. For example, the first features can include the body ribs 310A, 310B, 310C, 310D, 310E, 310F of FIG. 3. For example, the airfoil body 216 can be formed via additive manufacturing and/or machining. At block 604, the airfoil cap 218 is formed. The airfoil cap 218 includes second features. For example, the first features can include the ribs 308A, 308B, 308C, 308D, 308E, 308F of FIG. 3.

At block 606, the airfoil cap 218 is disposed within the recessed portion 222 of the airfoil body 216 to form the completed fan blade 200. In some examples, the airfoil cap 218 can be disposed on the lip 302 such that the interfaces 312A, 312B, 312C, 312D, 312E, 312F are formed. The airfoil cap 218 is deposited in the airfoil body 216 so the first face 212 is level (e.g., flush, etc.). In some examples, the cap 218 can be retained via one or more adhesives, one or more adhesives press-fit(s), one or more shrink-fit(s), one or more weld(s), and/or a combination thereof. Additionally or alternatively, the coupling of the cap 218 and the airfoil body 216 can cause any other suitable number of interfaces and/or joints (e.g., slip joints, sandwich joints, etc.). In some examples, during the operation of the fan blade 200, friction at the interfaces 312A, 312B, 312C, 312D, 312E, 312F can damp the fan blade 200, which reduces the vibrational response of the fan blade 200. At block 608, the fan blade 200 is coupled within a gas turbine engine 100. For example, a dovetail of the fan blade 200 can be coupled to a corresponding slot of a disk associated with the fan section 106. In other examples, the fan blade 200 can be coupled to the gas turbine engine 100 via any other suitable means.

Fan blades with internal damping structures are disclosed herein. The examples disclosed herein reduce the weight of fan blades and provide superior frictional damping when compared to prior fan blades. The examples disclosed herein improve the vibrational response and flutter response of fan blades and reduce the likelihood of fan blades vibrating in critical modes.

Further aspects of the present disclosure are provided by the subject matter of the following clauses:

Example 1 includes an airfoil to be disposed within a flow path of a gas turbine engine, the airfoil comprising an airfoil body having a first face, a second face and a recessed portion formed in the second face, and an airfoil cap having a first surface, the airfoil cap disposed within the recessed portion, the first surface substantially flush with the second face.

Example 2 includes the airfoil of example 1, further including a joint formed by a first feature of the airfoil cap and a second feature of the recessed portion, the joint acting as a frictional damper for the airfoil.

Example 3 includes the airfoil of any preceding clause, wherein the first feature is a first rib, the second feature is a second rib, and the joint is a slip joint formed by an interface between the first rib and the second rib.

Example 4 includes the airfoil of any preceding clause, wherein the interface is oriented in a plane substantially perpendicular to the first face.

Example 5 includes the airfoil of any preceding clause, wherein the first feature is a first rib, the second feature is a second rib, and the joint is a sandwich joint formed by an interface between the first rib and the second rib.

Example 6 includes the airfoil of any preceding clause, wherein the interface is oriented substantially parallel to the first face.

Example 7 includes the airfoil of any preceding clause, wherein the recessed portion of the second face includes a lip, the lip abutting a fourth face of the airfoil cap.

Example 8 includes a gas turbine engine comprising a fan section, and an airfoil disposed within the fan section, the airfoil including an airfoil body including a first face, and a second face including a recessed portion, and an airfoil cap including a first surface, the airfoil cap disposed within the recessed portion, the first surface substantially flush with the second face.

Example 9 includes the gas turbine engine of any preceding clause, wherein the airfoil further includes a joint formed by a first feature of the airfoil cap and a second feature of the recessed portion, the joint acting as a frictional damper for the airfoil.

Example 10 includes the gas turbine engine of any preceding clause, wherein the first feature is a first rib, the second feature is a second rib, and the joint is a slip joint formed by an interface between the first rib and the second rib.

Example 11 includes the gas turbine engine of any preceding clause, wherein the interface is oriented in a plane substantially perpendicular to the first face.

Example 12 includes the gas turbine engine of any preceding clause, wherein the first feature is a first rib, the second feature is a second rib, and the joint is a sandwich joint formed by an interface between the first rib and the second rib.

Example 13 includes the gas turbine engine of any preceding clause, wherein the interface is oriented in a plane substantially parallel to the first face.

Example 14 includes the gas turbine engine of any preceding clause, wherein the recessed portion of the second face includes a lip, the lip abutting a fourth face of the airfoil cap.

Example 15 includes a method including forming an airfoil body including a first face, a second face, and a recessed portion formed in the second face, forming an airfoil cap including a first surface, and disposing the airfoil cap within the recessed portion such that the first surface is substantially flush with the second face to form an airfoil.

Example 16 includes the method of any preceding clause, further including disposing the airfoil within a flow path of a gas turbine engine, the gas turbine engine defining an axial axis, a radial axis and a circumferential axis.

Example 17 includes the method of any preceding clause, wherein disposing the airfoil cap within the recessed portion includes forming a joint between a first feature of the airfoil body and a second feature of the airfoil cap, the joint acting as a frictional damper for the airfoil.

Example 18 includes the method of any preceding clause, wherein the first feature is a first rib, the second feature is a second rib, and the joint is a slip joint formed by an interface between the first rib and the second rib.

Example 19 includes the method of any preceding clause, wherein the first feature is a first rib, the second feature is a second rib, and the joint is a sandwich joint formed by an interface between the first rib and the second rib.

Example 20 includes the method of any preceding clause, wherein disposing the airfoil cap within the recessed portion includes abutting a fourth surface of the airfoil cap with a lip of the airfoil body.

The following claims are hereby incorporated into this Detailed Description by this reference, with each claim standing on its own as a separate embodiment of the present disclosure.

What is claimed is:

1. An airfoil to be disposed within a flow path of a gas turbine engine, the airfoil comprising:
    an airfoil body including:
        a first face; and
        a second face including a recessed portion; and
    an airfoil cap including a first surface, the airfoil cap disposed within the recessed portion, the first surface substantially flush with the second face; and
    a joint formed by an interface between a first integral feature of the airfoil cap and a second integral feature of the recessed portion, the interface is oriented in a plane substantially perpendicular to the first face.

2. The airfoil of claim 1, wherein the joint acts as a frictional damper for the airfoil.

3. The airfoil of claim 2, wherein the first integral feature is a first rib, the second integral feature is a second rib, and the joint is a slip joint.

4. The airfoil of claim 1, wherein the recessed portion of the second face includes a lip, the lip abutting a fourth face of the airfoil cap.

5. The airfoil of claim 4, further including a wear-resistant coating disposed on at least one of the lip or the interface.

6. The airfoil of claim 1, wherein the airfoil cap and the recessed portion define a first cavity and a second cavity, the first cavity having a first size and a first shape, the second cavity having a second size and a second shape, the first size different than the second size, the first shape different than the second shape.

7. The airfoil of claim 6, further including a cell structure disposed in the first cavity, the cell structure including:
   an external structure; and
   an internal structure retained by the external structure, the internal structure slidable with respect to the external structure.

8. A gas turbine engine comprising:
   a fan section; and
   an airfoil disposed within the fan section, the airfoil including:
      an airfoil body including:
         a first face; and
         a second face including a recessed portion; and
      an airfoil cap including a first surface, the airfoil cap disposed within the recessed portion, the first surface substantially flush with the second face; and
      a joint formed by an interface between a first integral feature of the airfoil cap and a second integral feature of the recessed portion, the interface is oriented in a plane substantially perpendicular to the first face.

9. The gas turbine engine of claim 8, wherein the joint acts as a frictional damper for the airfoil.

10. The gas turbine engine of claim 9, wherein the first integral feature is a first rib, the second integral feature is a second rib, and the joint is a slip joint formed.

11. The gas turbine engine of claim 8, wherein the recessed portion of the second face includes a lip, the lip abutting a fourth face of the airfoil cap.

12. The gas turbine engine of claim 11, wherein the airfoil includes a wear-resistant coating disposed on at least one of the lip or the interface.

13. The gas turbine engine of claim 8, wherein the airfoil cap and the recessed portion define a first cavity and a second cavity, the first cavity having a first size and a first shape, the second cavity having a second size and a second shape, the first size different than the second size, the first shape different than the second shape.

14. The gas turbine engine of claim 13, wherein the airfoil includes a cell structure disposed in the first cavity, the cell structure including:
   an external structure; and
   an internal structure retained by the external structure, the internal structure slidable with respect to the external structure.

15. A method including:
   forming an airfoil body including a first face, a second face, and a recessed portion formed in the second face;
   forming an airfoil cap including a first surface; and
   disposing the airfoil cap within the recessed portion such that the first surface is substantially flush with the second face to form an airfoil, the disposition of the airfoil cap including forming a joint between a first integral feature of the airfoil body and a second integral feature of the airfoil cap.

16. The method of claim 15, further including disposing the airfoil within a flow path of a gas turbine engine, the gas turbine engine defining an axial axis, a radial axis and a circumferential axis.

17. The method of claim 15, wherein the joint acts as a frictional damper for the airfoil.

18. The method of claim 17, wherein the first integral feature is a first rib, the second integral feature is a second rib, and the joint is a slip joint.

19. The method of claim 15, wherein the disposing of the airfoil cap within the recessed portion defines a first cavity and a second cavity, the first cavity having a first size and a first shape, the second cavity having a second size and a second shape, the first size different than the second size, the first shape different than the second shape.

20. The method of claim 15, wherein the disposing of the airfoil cap within the recessed portion includes disposing a fourth face of the airfoil cap onto to a lip of the airfoil body, the lip including a wear-resistant coating.

\* \* \* \* \*